(12) United States Patent
Nakagawa

(10) Patent No.: US 6,642,998 B2
(45) Date of Patent: Nov. 4, 2003

(54) MEASURING DEVICE

(75) Inventor: Kazuo Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/145,066

(22) Filed: May 13, 2002

(65) Prior Publication Data

US 2002/0176066 A1 Nov. 28, 2002

(30) Foreign Application Priority Data

May 23, 2001 (JP) ........................................ 2001-154573

(51) Int. Cl.[7] .............................. G01C 3/08; G01C 3/00; G01C 5/00
(52) U.S. Cl. ..................................... 356/3.14; 356/3.08
(58) Field of Search ............................... 356/3.08, 3.13, 356/3.14, 3.017, 5.15; 206/316.1

(56) References Cited

U.S. PATENT DOCUMENTS

| 3,471,235 A | * | 10/1969 | L.B. van Vliet, Jr. ...... 356/3.14 |
| 4,397,547 A | * | 8/1983 | Grassl .......................... 359/857 |
| 5,196,689 A | * | 3/1993 | Sugita et al. ............. 250/206.1 |
| 5,257,061 A | * | 10/1993 | Ishiguro ...................... 396/128 |
| 5,715,043 A | * | 2/1998 | Hasegawa et al. ......... 356/3.14 |
| 5,751,409 A | * | 5/1998 | Koyama ..................... 356/3.14 |
| 6,021,209 A | * | 2/2000 | Hirabayashi et al. ....... 382/103 |
| 6,411,782 B1 | * | 6/2002 | Kindaichi ................... 396/196 |

FOREIGN PATENT DOCUMENTS

JP          051578107          6/1993

* cited by examiner

Primary Examiner—Thomas H. Tarcza
Assistant Examiner—Brian Andrea
(74) Attorney, Agent, or Firm—Robin, Blecker & Daley

(57) ABSTRACT

There is provided a measuring device whose measuring accuracy is prevented from lowering when a plurality of lenses for guiding light rays to each of a plurality of photoelectric converters are integrated for the purpose of reduction in size. The measuring device is comprised of a composite optical part and a holding member. The composite optical parts is comprised of at least first and second photoelectric converters, and integrated first and second optical functional members that guide light rays to the first and second photoelectric converters. The holding member holds the first and second photoelectric converters and the composite optical part. The first and second optical functional members of the composite optical part are coupled so as to restrain light rays entering one of the first and second optical functional members and exiting from the other one of the first and second optical functional members from entering one of the first and second photoelectric converters corresponding to the other optical functional member.

19 Claims, 4 Drawing Sheets

MEASURING DEVICE

BACKGROUND OF THE INVENTION

1. Field of the Invention

The present invention relates to a measuring device including a composite optical part in which a plurality of optical parts for guiding light rays to each of a plurality of photoelectric converters are integrated.

2. Description of the Related Art

Recently, with improvement in performance of cameras and reduction in the size thereof, various measuring devices such as rangefinding devices and photometric devices installed in cameras have also been reduced in size. For example, as shown in FIG. 3, the reduction in size is realized by mounting two photoelectric converters with different functions on the same semiconductor chip. In FIG. 3, reference numeral 1 designates a casing holding the entire device, 2 designates a semiconductor chip, 3 designates a photometric sensor comprised of a photoelectric converter, 4 designates a rangefinding sensor comprised of a photoelectric converter, 5 designates a photometric lens for guiding light rays to the photometric sensor 3, and 6 designates a rangefinding lens for guiding light rays to the rangefinding sensor 4. The photometric lens 5 and rangefinding lens 6 have collars 5a and 6a for holding and fixing the lenses to the casing 1, respectively, and the collars 5a and 6a are adhesively fixed to a holding portion 1a of the casing 1. Reference numeral 7 designates a typical optical path of light rays guided to the photometric sensor 3 by the photometric lens 5, and reference numeral 8 designates a typical optical path of light rays guided to the rangefinding sensor 4 by the rangefinding lens 6. The casing 1 is provided with a wall portion 1b for preventing undesired light rays from reaching each of the sensors in order to prevent a lowering in measuring accuracy due to undesired light rays being received by the sensors. However, as can be understood from FIG. 3, a space for the holding portion 1a for holding and fixing each lens to the casing 1 is necessary, and accordingly the entire device becomes large in size.

In a photometric device disclosed in Japanese Laid-Open Patent Publication (Kokai) No. H05-158107, photometry is carried out by providing a photoelectric converter between a pair of line sensors provided on the same semiconductor chip to be used for passive rangefinding, whereby the rangefinding device and the photometric device are integrated to realize reduction in size. However, since a total of three lenses including a pair of lenses for rangefinding and a lens for photometry are arranged horizontally and held and fixed to the casing, the entire device becomes large in size by the space for holding and fixing the lenses to the casing, as is the case with the measuring device of FIG. 3.

As a method for solving the abovementioned problem, a proposal has been made for reducing the space for holding and fixing the photometric lenses and the rangefinding lens to the casing by integrating the photometric lenses and the rangefinding lense, as shown in FIG. 4. In FIG. 4, reference numeral 9 designates an integrated lens which is comprised of a photometric lens portion 9a for guiding light rays to the photometric sensor 3 and a rangefinding lens portion 9b for guiding light rays to the rangefinding sensor 4, and has collars 9c for holding and fixing the integrated lens to the casing 1. By thus integrating the photometric lens 5 and the rangefinding lens 6 of FIG. 3 to form the integrated lens 9, the collars 5a and 6a that have been provided inside the photometric lens 5 and the rangefinding lens 6 are omitted, the corresponding holding portion 1a of the casing 1 becomes unnecessary, and accordingly the entire device becomes smaller in size.

However, since the lenses are integrated, it becomes inevitable that the wall portion 1b that has been provided between the photometric lens 5 and the rangefinding lens 6 in FIG. 3 extends only up to a position at which no interference with the integrated lens 9 occurs. Therefore, an optical path 10 is formed through which light rays from the outside of ranges to be measured enters from the photometric lens portion 9a, passes through the integrated portion, and exits from the rangefinding lens 9b and reaches the rangefinding sensor 4. As a result, the rangefinding sensor 4 receives undesired light rays and lowers in rangefinding accuracy.

Furthermore, conversely, undesired light rays entering from the rangefinding lens portion 9b enters from the photometric lens portion 9a and reaches the photometric sensor 3 and accordingly the photometric sensor 3 lowers in photometric accuracy.

SUMMARY OF THE INVENTION

It is an object of the present invention to provide a measuring device whose measuring accuracy is prevented from lowering when a plurality of lenses for guiding light rays to each of a plurality of photoelectric converters are integrated for the purpose of reduction in size.

To attain the above object, in a first aspect of the present invention, there is provided a measuring device comprising a composite optical part including at least first and second photoelectric converters, and integrated first and second optical functional members that guide light rays to the first and second photoelectric converters, and a holding member that holds the first and second photoelectric converters and the composite optical part, wherein the first and second optical functional members of the composite optical part are coupled so as to restrain light rays entering one of the first and second optical functional members and exiting from the other one of the first and second optical functional members from entering one of the first and second photoelectric converters corresponding to the other optical functional member.

With the above construction according to the first aspect of the present invention, optical parts can be integrated without an optical path of light rays from the outside of ranges to be measured being formed, whereby the measuring device can be reduced in size without lowering in measuring accuracy.

Preferably, the first and second optical functional members are coupled in a fashion being offset in an optical axis direction of the measuring device.

Also preferably, the first and second optical functional members are different in focal length from each other.

More preferably, the first and second optical functional members have opposed surfaces formed due to the first and second optical functional members being coupled in a fashion being offset in the optical axis direction, and the opposed surfaces have been subjected to surface treatment.

Since the surface treatment is thus applied to the opposed end faces formed by the first and second optical functional members being coupled in a fashion being in the optical axis direction, formation of an optical path of light rays from the outside of the ranges to be measured can be more securely prevented. Preferably, the measuring device according to the first aspect comprises a semiconductor chip, and the first and second photoelectric converters are mounted on the semiconductor chip.

Since the first and second photoelectric converters are thus mounted on the same semiconductor chip, a measuring device that is further reduced in size can be realized.

To attain the above object, in a second aspect of the present invention, there is provided a measuring device comprising a pair of rangefinding sensors arranged at a predetermined distance from each other, a photoelectric converter disposed between the pair of rangefinding sensors, a composite optical part including a pair of rangefinding lens portions for guiding light rays to the pair of rangefinding sensors, and a predetermined optical functional member for guiding light rays to the photoelectric converter, the pair of rangefinding lens portions and the predetermined optical functional member being integrated together, and a holding member that holds the rangefinding sensors, the photoelectric converter, and the composite optical part, wherein the rangefinding lens portions and the optical functional member of the composite optical part are coupled so as to restrain light rays entering one of the rangefinding lens portions and the optical functional member and exiting from the other one of the rangefinding lens portions and the optical functional member from entering one of the rangefinding sensors and the photoelectric converter corresponding to the other one of the rangefinding lens portions or the optical functional member.

With the construction according to the second aspect of the present invention, optical parts can be integrated without an optical path from the outside of ranges to be measured being formed when a passive rangefinding device and another measuring device are integrated, whereby the measuring device can be reduced in size without lowering in measuring accuracy.

Preferably, the rangefinding lens portions and the optical functional members are coupled in a fashion being offset in an optical axis direction of the measuring device.

Also preferably, the rangefinding lens portions and the optical functional members are different in focal length from each other.

More preferably, the rangefinding lens portions and the optical functional members have opposed surfaces formed due to the rangefinding lens portions and the optical functional members being coupled in a fashion being offset in the optical axis direction, and the opposed surfaces have been subjected to surface treatment.

Since the surface treatment is applied to the opposed end faces formed due to the optical functional members being coupled in a fashion being offset in the optical axis direction, formation of an optical path of light rays from the outside of the ranges to be measured can be more securely prevented.

Preferably, the photoelectric converter comprises a remote control sensor.

As a result, a measuring device including a rangefinding device and a remote control device integrated together can be realized.

Preferably, the photoelectric converter comprises a photometric sensor.

As a result, a measuring device including a rangefinding device and a photometric device integrated together can be realized.

Preferably, the measuring device according to the second aspect comprises a semiconductor chip, and the pair of rangefinding sensors and the photoelectric converter are mounted on the semiconductor chip.

Since the pair of rangefinding sensors and the photoelectric converter are thus mounted on the same semiconductor chip, a measuring device which is further reduced in size can be realized.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
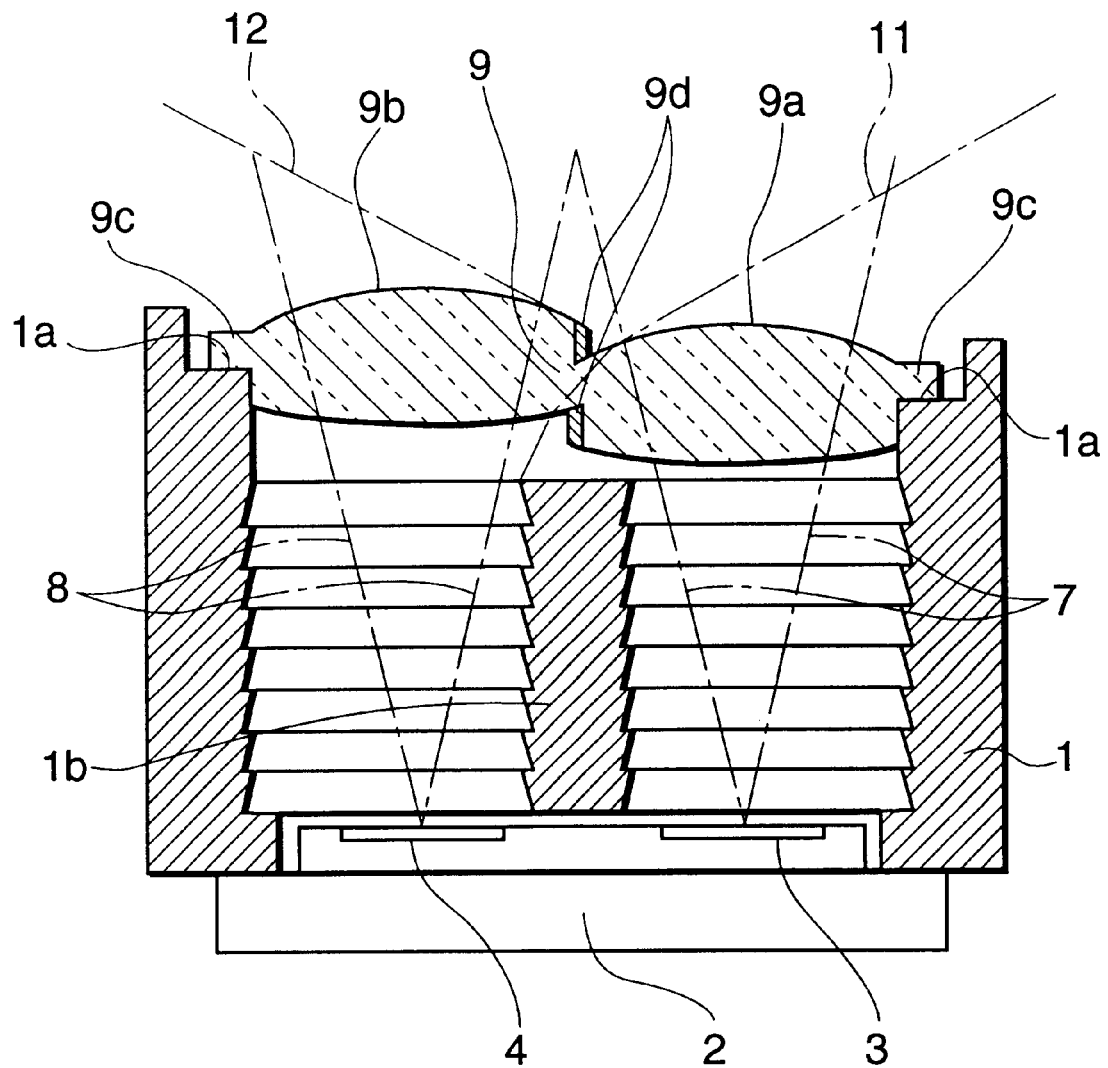
FIG. 1 is a sectional view showing a measuring device according to a first embodiment of the present invention.

FIG. 1 is a sectional view showing a measuring device according to a first embodiment of the present invention. In FIG. 1, a casing 1 holds the entire device, and a semiconductor chip 2 is adhesively fixed to the casing 1. A photometric sensor 3 is comprised of a photoelectric converter, and a rangefinding sensor 4 is comprised of a photoelectric converter. Reference numeral 7 designates a typical optical path of light rays guided to the photometric sensor 3 by a photometric lens portion 9a, described later, and 8 designates a typical optical path of light rays guided to the rangefinding sensor 4 by a rangefinding lens portion 9b described later. In order to prevent measuring accuracy from lowering due to light rays being received by each of the sensors from the outside of ranges to be measured, the casing 1 is provided with a wall portion 1b for preventing undesired light rays from reaching each of the sensors.

Reference numeral 9 designates an integrated lens 9 which is comprised of a photometric lens portion 9a for guiding light rays to the rangefinding sensor 3, and a rangefinding lens portion 9b for guiding light rays to the rangefinding sensor 4, which are integrated, i.e. formed in one piece, in such a fashion that the center position of the thickness of the photometric lens portion 9a in the optical axis direction is offset toward the sensor side in the optical axis direction from the center position of the thickness of the rangefinding lens portion 9b in the optical axis direction. That is, the photometric lens portion 9a is offset toward the sensor side in the optical axis direction from the rangefinding lens portion 9b. The focal length of the photometric lens portion 9a is shorter than that of the rangefinding lens portion 9b by the amount of offset. Collars 9c are formed integrally on the integrated lens 9 for holding and fixing the integrated lens 9 to the casing 1, at which the lens 9 is adhesively fixed to the holding portions 1a of the casing 1. Furthermore, an antireflection coating 9d is applied to the staggered opposed surfaces of the lens portions 9a and 9b that are formed by offset disposition of the photometric lens portion 9a and rangefinding lens portion 9b in the optical axis direction.

Reference numeral 11 designates an optical path of light rays entering the photometric lens portion 9a from the outside of ranges to be photometered, and 12 designates an optical path of light rays entering the rangefinding lens portion 9b from the outside of ranges to be found.

With the above described construction, the optical path 11 entering the photometric lens portion 9a passes through the integrated portion of the integrated lens 9 and exits into the casing 1 from the rangefinding lens 9b, however, the optical path is blocked by the wall portion 1b to be prevented from reaching the rangefinding sensor 4. On the other hand, the optical path 12 entering the rangefinding lens portion 9b reaches the opposed surface of the rangefinding lens 9b, however, it cannot exit from the inside of the rangefinding lens portion 9b since the antiantireflection coating 9d is applied to the opposed surface. Therefore, undesired light rays from the outside of ranges to be measured are prevented from reaching the photometric sensor 3 and rangefinding sensor 4, so that the measuring accuracy of each of the sensors is prevented from lowering.

Furthermore, since the two lenses are integrated, the space for holding and fixing the lenses to the casing 1 can be reduced, and accordingly the measuring device itself can be reduced in size.

Although the above described embodiment is directed to the measuring device comprised of the photometric sensor and rangefinding sensor that are integrated together, the present invention is not limited to the photometric sensor and the rangefinding sensor, and any sensors may be used insofar they are comprised of photoelectric converters. Furthermore, although antireflection coatings are applied to the opposed surfaces of the lens portions, any method can be employed insofar as it can control light rays entering each lens so as to prevent them from reaching the sensor. For example, matt finishing may be applied to the opposed surfaces of the lens portions to diffuse and weaken light rays, whereby the light rays are prevented from reaching the sensors. Although the photometric sensor and the rangefinding sensor are mounted on the same semiconductor chip, they may be mounted on separate small-sized semiconductor chips.

Figure 2:
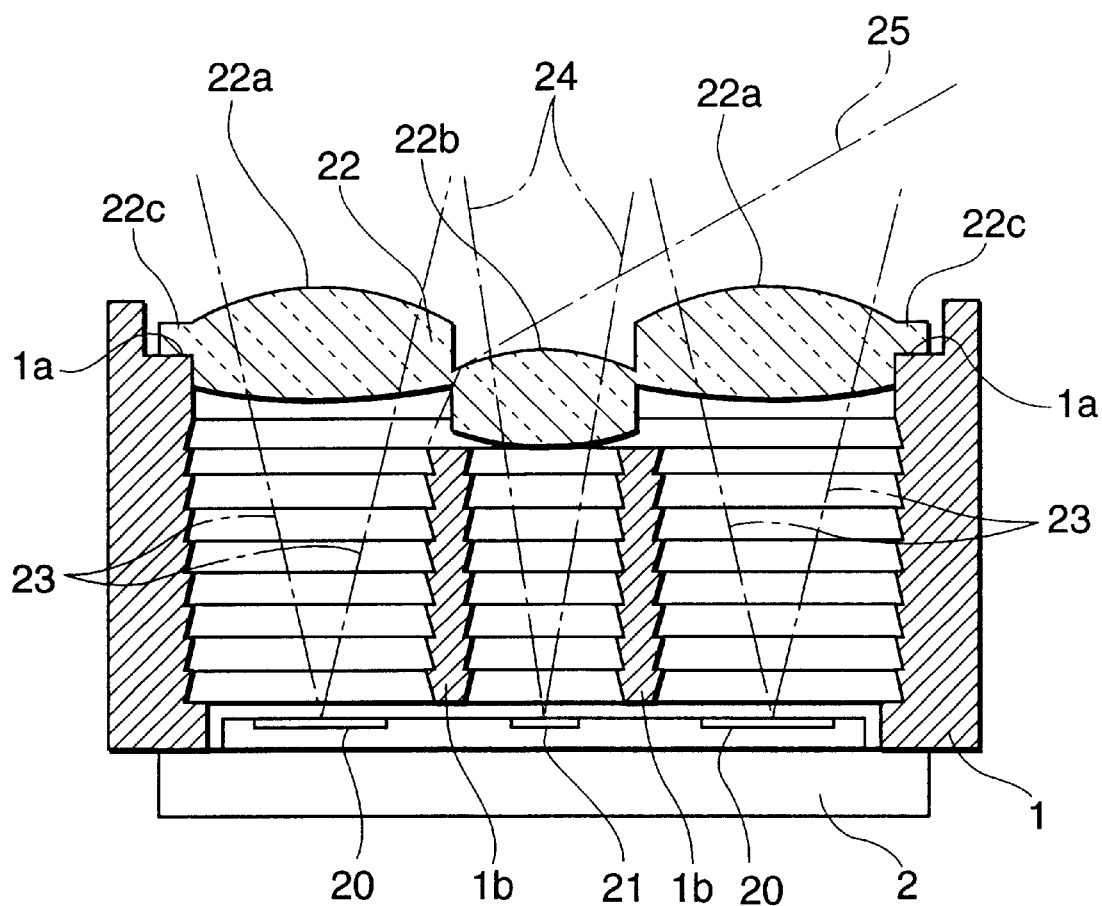
FIG. 2 is a sectional view showing a measuring device which is a passive type according to a second embodiment of the present invention.
Figure 3:
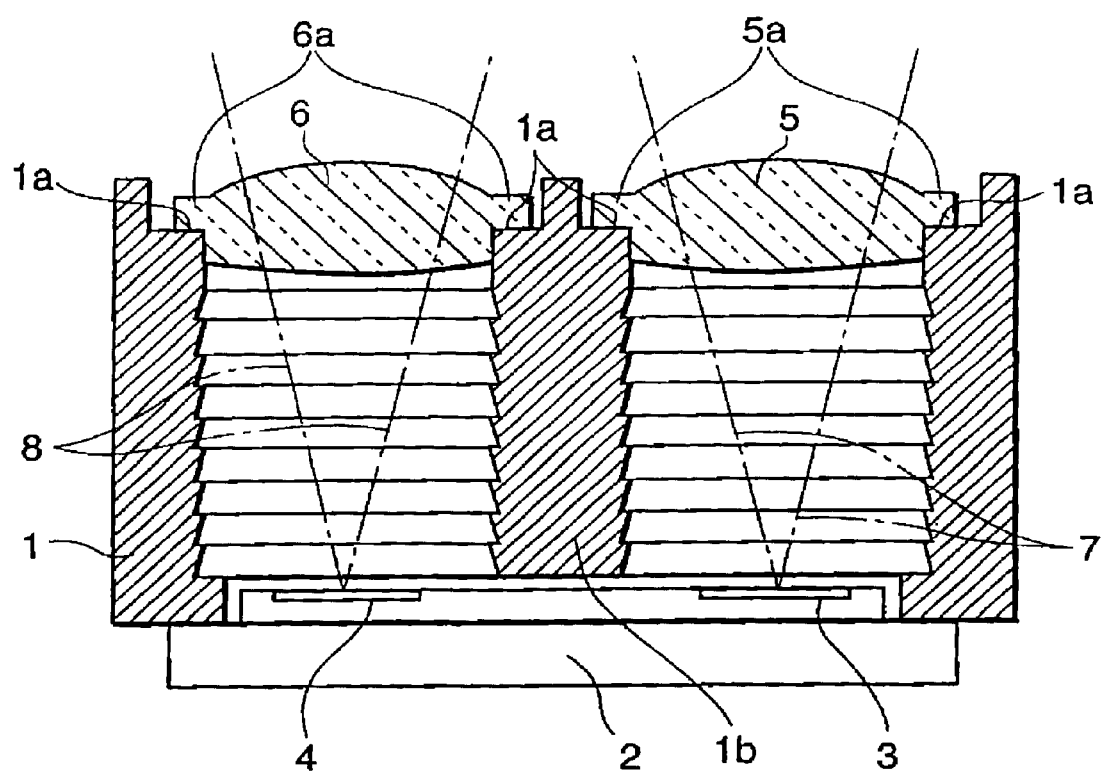
FIG. 3 is a sectional view showing a conventional lens-separated type measuring device.
Figure 4:
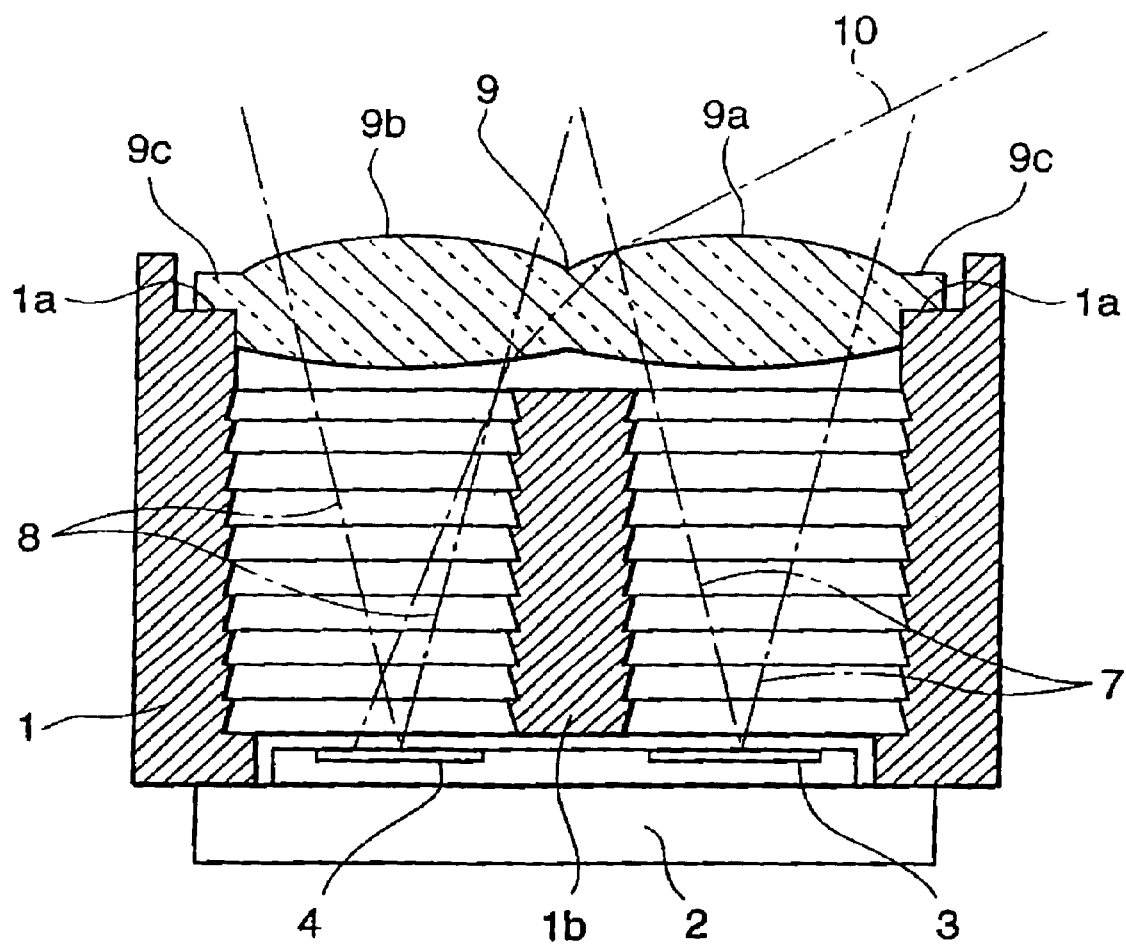
FIG. 4 is a sectional view showing a conventional lens-integrated type measuring device.

FIG. 2 is a sectional view showing a measuring device which is a passive type according to a second embodiment of the present invention. In FIG. 2, a casing 1 holds the entire device, and a semiconductor chip 2 is adhesively fixed to the casing 1. A pair of line sensors 20, which are comprised of photoelectric converters, are provided for performing passive rangefinding. Further, a remote control sensor 21 comprised of a photoelectric converter is provided.

Reference numeral 22 designates an integrated lens comprised of a pair of rangefinding lens portions 22a for guiding light rays to the pair of line sensors 20, and a remote control lens portion 22b for guiding light rays to the remote control sensor 21, in which the rangefinding lens portions 22a and remote control lens portion 22b are integrated in such a fashion that the center position of the thickness of the remote control lens portion 22b in the optical axis direction is offset toward the sensor side in the optical axis direction from the center position of the thickness of the rangefinding lens portions 22a in the optical axis direction. Furthermore, collars 22c are formed integrally on the integrated lens 22 for holding and fixing the integrated lens 22 to the casing 1. The collars 22c are adhesively fixed to the holding portions 1a of the casing 1.

Reference numeral 23 designates a typical optical path of light rays guided to each line sensor 20 by each of the rangefinding lens portions 22a, and 24 designates a typical optical path of light rays guided to the remote control sensor 21 by the remote control lens portion 22b. The casing 1 is provided with wall portions 1b for preventing undesired light rays from reaching the respective sensors in order to prevent a lowering in measuring accuracy due to undesired light rays being received by the sensors from the outside of ranges to be measured. Reference numeral 25 designates an optical path of light rays entering the remote control lens portion 22b from the outside of ranges to be found.

With the above described construction, the optical path 25 entering the remote control lens portion 22b passes through the integrated portion of the integrated lens 22 and exits from the rangefinding lens 22a into the inside of the casing 1, however, the optical path 25 is blocked by the wall portion 1b to be prevented from reaching the line sensor 20. Therefore, since undesired light rays from the outside of ranges to be measured are thus prevented from reaching the line sensor 20, the rangefinding accuracy is prevented from lowering. Furthermore, even in a case where there is an optical path (not shown) that enters from the rangefinding lens portions 22a, exits from the remote control lens portion 22b, and reaches the remote control sensor 21, this optical path does not obstruct receiving of remote control signals at all, so that antireflection coating as used in the first embodiment becomes unnecessary.

Furthermore, since three lenses are integrated together, the space for holding and fixing the lenses in the casing 1 can be reduced, and therefore the measuring device itself can be reduced in size.

Although the above described embodiment is directed to the sensor provided between a pair of line sensors for rangefinding is a remote control sensor, the present invention is not limited to this and any other sensor may be used insofar as it is comprised of a photoelectric converter. However, for example, in a case where a photometric sensor is used, it is preferable that surface treatment is applied to the opposed surfaces of the lens portions to securely prevent formation of unnecessary optical paths. Furthermore, although the rangefinding sensor and the remote control sensor are mounted on the same semiconductor chip, they may be mounted on separate small-sized semiconductor chips.

What is claimed is:

1. A measuring device comprising:

a composite optical part including at least first and second photoelectric converters, and integrated first and second lenses tat guide light rays to said first and second photoelectric converters; and a holding member tat holds said first and second photoelectric converters and said composite optical part;

wherein said first and second lenses of said composite optical part are coupled so as to restrain light rays entering one of said first and second lenses and exiting from the other one of said first and second lenses from entering one of said first and second photoelectric converters corresponding to the other lens.

2. A measuring device as claimed in claim 1, wherein said first and second lenses are coupled in a fashion being offset in an optical axis direction of the measuring device.

3. A measuring device as claimed in claim 1 or 2, wherein said first and second lenses are different in focal length from each other.

4. A measuring device as claimed in claim 2, wherein said first and second lenses have opposed surfaces formed due to said first and second lenses being coupled in a fashion being offset in the optical axis direction, said opposed surfaces having been subjected to surface treatment.

5. A measuring device as claimed in claim 4, wherein said surface treatment comprises antireflection coating.

6. A measuring device as claimed in claim 4, wherein said surface treatment comprises matt finishing.

7. A measuring device comprising:

a pair of rangefinding sensors arranged at a predetermined distance from each other a photoelectric converter disposed between said pair of rangefinding sensors;

a composite optical part including a pair of rangefinding lens portions for guiding light rays to said pair of rangefinding sensors, and a predetermined optical functional member for guiding light rays to said photoelectric converter, said pair of rangefinding lens portions and said predetermined optical functional member being integrated together; and a holding member that holds said rangefinding sensors, said photoelectric converter, and said composite optical part;

wherein said rangefinding lens portions and said optical functional member of said composite optical part are coupled so as to restrain light rays entering one of said rangefinding lens portions and said optical functional member and exiting from the other one of said rangefinding lens portions and said optical functional member from entering one of said rangefinding sensors and said photoelectric converter corresponding to the other one of said rangefinding lens portions or said optical functional member; and wherein said rangefinding lens portions and said optical functional members are coupled in a fashion being offset in an optical axis direction of the measuring device.

8. A measuring device as claimed in claim 7, wherein said rangefinding lens portions and said optical functional members have opposed surfaces formed due to said rangefinding lens portion and said optical functional members being coupled in a fashion being offset in the optical axis direction, said opposed surfaces having been subjected to surface treatment.

9. A measuring device comprising:

a pair of rangefinding sensors arranged at a predetermined distance from each other;

a photoelectric converter disposed between said pair of rangefinding sensors;

a composite optical part including pair of rangefinding lens portions for guiding light rays to said pair of rangefinding sensors, and a predetermined optical functional member for guiding light rays to said photoelectric converter, said pair of rangefinding lens portions and said predetermined optical functional member being integrated together; and a holding member that holds said rangefinding sensors, said photoelectric converter, and said composite optical part;

wherein said rangefinding lens portions and said optical functional member of said composite optical part are coupled so as to restrain light rays entering one of said rangefinding lens portions and said optical functional member and exiting from the other one of said rangefinding lens portions and said optical functional member from entering one of said rangefinding sensors and said photoelectric converter corresponding to the other one of said rangefinding lens portions or said optical functional member; and wherein said rangefinding lens portions and said optical functional members are different in focal length from each other.

10. A measuring device as claimed in claim 9, wherein said rangefinding lens portions and said optical functional members are coupled in a fashion being offset in an optical axis direction of the measuring device.

11. A measuring device as claimed in claim 7, 9 or 10, wherein said photoelectric converter comprises a remote control sensor.

12. A measuring device as claimed in claim 7, 9 or 10, wherein said photoelectric converter comprises a photometric sensor.

13. A measuring device as claimed in claim 7, 9 or 10, comprising a semiconductor chip, and wherein said pair of rangefinding sensors and said photoelectric converter are mounted on said semiconductor chip.

14. A measuring device comprising:

a composite optical part including at least first and second photoelectric converters, and integrated first and second optical functional members tat guide light rays to said first and second photoelectric converters; and a holding member that holds said first and second photoelectric converters and said composite optical part;

wherein said first and second optical functional members of said composite optical part are coupled so as to restrain light rays entering one of said first and second optical functional members and exiting from the other one of said first and second optical functional members from entering one of said first and second photoelectric converters corresponding to the other optical functional member, and wherein said first and second optical functional members are coupled in a fashion being offset in optical axis direction of the measuring device.

15. A measuring device comprising:

a composite optical part including at least first and second photoelectric converters, and integrated first and second optical functional members that guide light rays to said first and second photoelectric converters; and a holding member that holds said first and second photoelectric converters and said composite optical part;

wherein said first and second optical functional members of said composite optical part are coupled so as to restrain light rays entering one of said first and second optical functional members and exiting from the other one of said first and second optical functional members from entering one of said first and second photoelectric converters corresponding to the other optical functional member, and wherein said first and second optical functional members are different in focal length from each other.

16. A measuring device comprising:

a composite optical part including at least first and second photoelectric converters, and integrated first and second optical functional members that guide light rays to said first and second photoelectric converters; and a holding member tat holds said first and second photoelectric converters and said composite optical part;

wherein said first and second optical functional members of said composite optical part are coupled so as to restrain light rays entering one of said first and second optical functional members and exiting from the other one of said first and second optical functional members from entering one of said first and second photoelectric converters corresponding to the other optical functional member, and wherein said first and second optical functional members have opposed surfaces formed due to said first and second optical functional members being coupled in a fashion being offset in the optical axis direction, said opposed surfaces having been subjected to surface treatment.

17. A measuring device as claimed in claim 1, 14, 15 or 16, comprising a semiconductor chip, and wherein said first and second photoelectric converters are mounted on said semiconductor chip.

18. A measuring device as claimed in claim 16, wherein said surface treatment comprises antireflection coating.

19. A measuring device as claimed in claim 16, wherein said surface treatment comprises matt finishing.

* * * * *

UNITED STATES PATENT AND TRADEMARK OFFICE
CERTIFICATE OF CORRECTION

PATENT NO. : 6,642,998 B2 Page 1 of 1
DATED : November 4, 2003
INVENTOR(S) : Kazuo Nakagawa It is certified that error appears in the above-identified patent and that said Letters Patent is hereby corrected as shown below:

Column 6,
Lines 47 and 49, delete "tat" and insert -- that --.

Column 7,
Line 38, delete "portion" and insert -- portions --.

Column 8,
Line 20, delete "tat" and insert -- that --.

Signed and Sealed this

Thirty-first Day of August, 2004

JON W. DUDAS
*Director of the United States Patent and Trademark Office*